H. EWING.
SPRING CONTROLLED VEHICLE WHEEL LINK.
APPLICATION FILED SEPT. 28, 1909.

951,000.

Patented Mar. 1, 1910.
2 SHEETS—SHEET 1.

Witnesses:
Samuel W. Balch
Frank C. Cole

Inventor,
Hugh Ewing,
by Thomas Ewing Jr.
Attorney.

H. EWING.
SPRING CONTROLLED VEHICLE WHEEL LINK.
APPLICATION FILED SEPT. 28, 1909.

951,000.

Patented Mar. 1, 1910.
2 SHEETS—SHEET 2.

Witnesses:
Samuel W. Balch
Frank C. Cole

Inventor.
Hugh Ewing
by Thomas Ewing, Jr.
Attorney

UNITED STATES PATENT OFFICE.

HUGH EWING, OF COLUMBUS, OHIO.

SPRING-CONTROLLED VEHICLE-WHEEL LINK.

951,000.  Specification of Letters Patent.  Patented Mar. 1, 1910.

Application filed September 28, 1909. Serial No. 519,954.

*To all whom it may concern:*

Be it known that I, HUGH EWING, a citizen of the United States of America, and a resident of the city of Columbus, county of Franklin, and State of Ohio, have invented certain new and useful Improvements in Spring-Controlled Vehicle-Wheel Links, of which the following is a specification.

This invention is an improvement upon the invention set forth in my application for Letters Patent of the United States filed December 2, 1908, Serial No. 465,738.

The specific object of these improvements is to provide ample springs conveniently and efficiently disposed for controlling the movement of the link upon its pivot.

Figure 1:
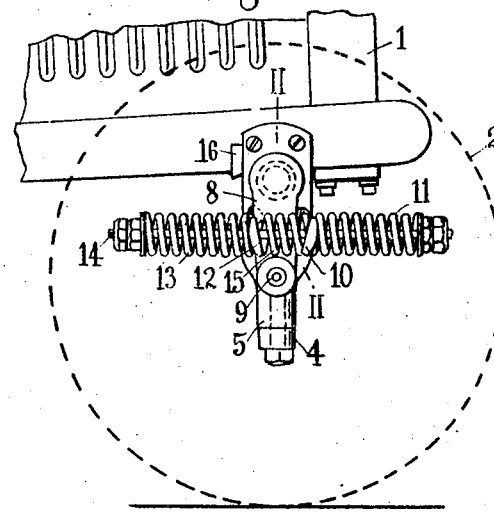
Figure 2:
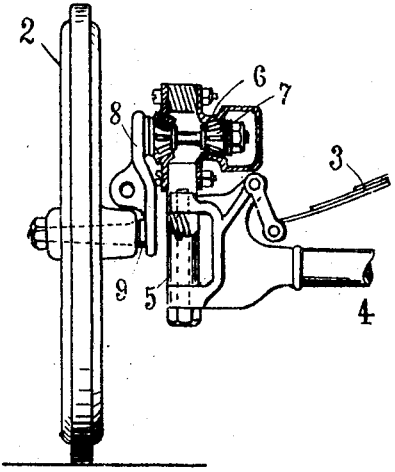
Figure 3:
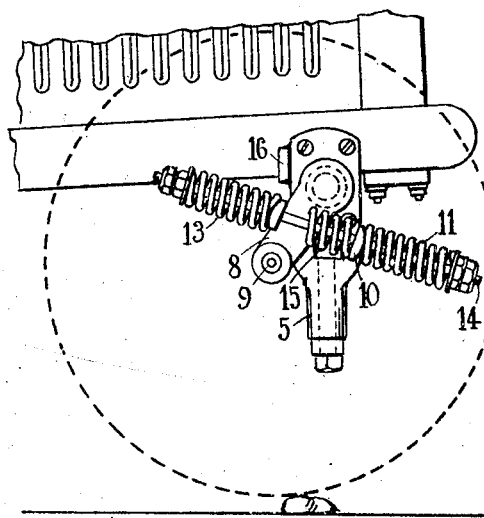
Figure 4:
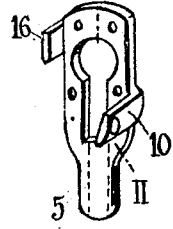
Figure 5:
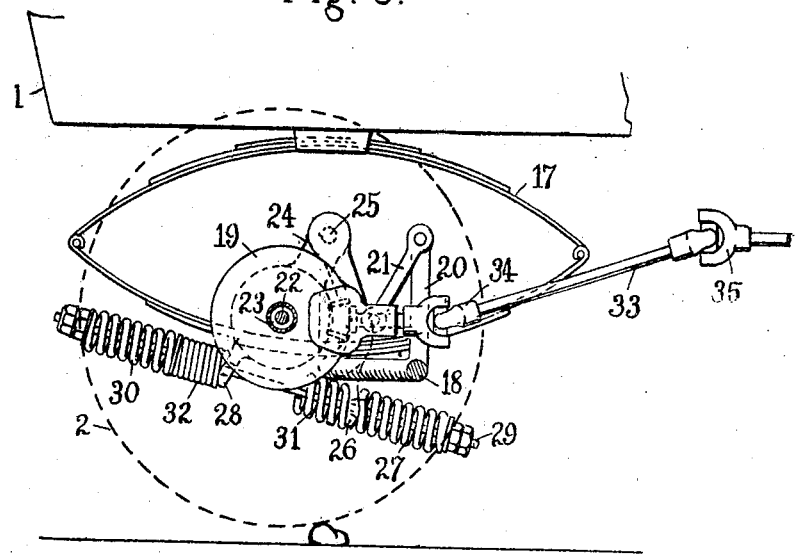
Figure 6:
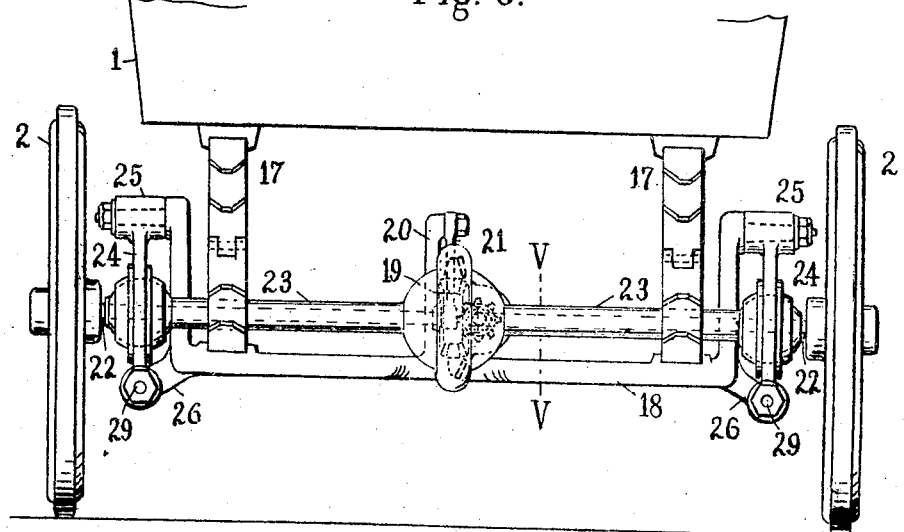

In the accompanying two sheets of drawings which form a part of this application—Figure 1 is a side elevation showing one form of my invention applied to the front wheel of an automobile. Fig. 2 is a section on the line II—II of Figs. 1 and 4. Fig. 3 is a side elevation of the mechanism operating to permit the wheel to pass over an obstruction. Fig. 4 is a perspective of the bracket to which the wheel-link is pivoted. Fig. 5 is a section on the line V—V of Fig. 6 showing my invention applied to the rear wheel of an axle-driven automobile. Fig. 6 is a rear view of the application to the rear wheels.

In the form of Figs. 1 to 4 is shown a portion of the forward end of an automobile, one corner of the radiator 1, which is a part of the automobile body appearing and being supported, from the forward running wheel 2 through a leaf spring 3 which connects the body with an axletree 4 having at either end a steering-knuckle 5 hinged thereto through a vertical hinge as is usual in automobile construction. This knuckle has two arms which extend upward, encircling the upper arm of the yoke, to which it is pivoted, meeting above it and there supporting a horizontally disposed bearing 6 in which is journaled a trunnion with roller or other suitable bearing 7 formed at the upper end of a spring-controlled supporting link 8 and serving as a pivot between the link and knuckle. The lower end of this link carries an axle 9 on which the running wheel turns. This axle is parallel with the roller-bearing trunnion, and the axis of the roller-bearing trunnion is normally substantially over the axis of the running-wheel axle so that the link is pivoted normally substantially over the axis of the running-wheel axle. The steering-knuckle is provided with a bracket 10 which serves as an abutment for a compression spring 11. The supporting link is provided with an arm 12 opposite the bracket against which bears one end of a compression spring 13. The adjacent ends of the two springs abut respectively against the bracket of the steering-knuckle and the arm of the supporting link. The opposite ends of these springs are connected and the springs thereby coupled by a sliding rod 14 so that they act together. This rod passes through eyes in the bracket and arm and slides freely in both when the springs operate. The springs control the supporting link upon its pivot, and by them it is normally maintained in its vertical position and in this position the springs are relieved from the weight of the body of the automobile. The springs oppose the displacement rearwardly and upwardly of the lower end of the link, wheel-axle and running wheel, and when they have been so displaced serve to return the link to its normally vertical position. Forcible impact on the return to the vertical position after having been swung rearwardly is prevented by a buffer, which may be of any suitable character, and is shown in the form of a short, stiff compression spring 15. The steering-knuckle carries an arm 16 which prevents the link from swinging all the way up, should the springs be removed carelessly without jacking up the axletree.

In the form shown in Figs. 5 and 6 the invention is illustrated with such modification as is desirable to adapt it to the rear axle-driven wheels of an automobile. The automobile body is supported from the rear running wheels through leaf springs 17 17 which connect the body with an axletree 18. The axletree is deflected or looped at its middle point so as to circle in front of an incased differential 19. An arm or post 20 is carried by this looped portion of the axletree and from its upper end the forward side of the differential is supported through a pivoted link 21. The running wheel axles 22 22 are carried in sleeves 23 23 extending from the differential. Near the outer ends of the sleeves are ball-and-socket joints, the ball in either case being attached to the sleeve, and the incasing socket being a portion of the corresponding link 24. This permits either wheel to be retarded independently of the other without twisting or straining the links. The upper ends of these links engage trunnions 25 25 at the upwardly turned ends of the axletree. On each side of the vehicle at the angles where the ends of the axletree are turned upward are formed brackets 26 26. Each bracket serves as an abutment for a compression spring 27. The supporting link is provided with an arm 28 opposite the bracket, and a sliding rod 29 passes freely through eyes in the bracket and arm and connects the outer end of the compression spring which bears against the bracket with the outer end of a second compression spring 30. The springs are thereby coupled so that they act together to control the supporting link and maintain it normally in a substantially vertical position with the trunnion to which the link is pivoted substantially vertical over the wheel axle. A short stiff compression spring 31 is placed between the arm and bracket and acts as a buffer. The functions of the several springs are the same as that of the corresponding springs which control the supporting link for the forward wheel. In addition, this form includes a more limber spring 32 which is designed to yield more readily when the link is first displaced rearwardly by reason of the wheel striking an obstruction, but to yield only through a short distance when the convolutions come together and throw the strain entirely on the heavier springs. When either wheel is rearwardly displaced the connecting wheel axles are carried back angularly and the differential is displaced rearwardly by half the amount. To permit this the suspension above described is provided, and the shaft 33 through which power is communicated to the differential is provided with universal joints 34 35 at two points along its length, the lower end of which is also extensible.

The operation of the invention is as follows. When the vehicle is moving forward rapidly and one of the wheels strikes an obstruction, as a stone in the road, that wheel is stopped momentarily in its forward movement, but, by reason of the swinging link connection, the vehicle-body continues forward unchecked and without appreciable jar being communicated thereto while the wheel displaces with respect to the body, first rearwardly and horizontally, and then, following a curved path, rises without lifting the vehicle-body and passes over the obstruction. The springs connected with the link then return the parts to their normal position and the buffer arrests them without jar. These springs may be placed either above or below the wheel axle, the higher they are placed the shorter and stiffer they will have to be.

With this invention heavy loads are more easily started, since the vehicle-body can move forward and acquire momentum before the wheels need to move, and an obstructed wheel will rise over the obstruction without lifting or stopping the vehicle.

What I claim as new, and desire to secure by Letters Patent of the United States, is—

1. In a vehicle, the combination of a wheel-axle, a body, a supporting link for the body carried upon the wheel-axle, the link being pivoted substantially vertically over the wheel-axle, a pair of springs disposed on opposite sides of the link by which the link is normally maintained in its vertical position, a bracket suitably mounted for resisting the thrust of the springs, the adjacent ends of the springs abutting against the link and bracket, and a sliding rod for connecting the springs, substantially as described.

2. In a vehicle, the combination of a wheel-axle, a body, a supporting link for the body carried upon the wheel-axle, the link being pivoted substantially vertically over the wheel-axle, a pair of springs disposed on opposite sides of the link which are normally relieved from the weight of the body for controlling the movement of the link upon its pivot, a bracket suitably mounted for resisting the thrust of the springs, the adjacent ends of the springs abutting against the link and bracket, and a sliding rod for connecting the springs, substantially as described.

3. In a vehicle, the combination of a wheel-axle, a body, a supporting link for the body carried upon the wheel-axle, the link being pivoted substantially vertically over the wheel-axle and permitting the wheel-axle to displace along a rearwardly and upwardly curving path when a wheel strikes an obstruction, a pair of springs disposed on opposite sides of the link for opposing the displacement of the link, a bracket suitably mounted for resisting the thrust of the springs, the adjacent ends of the springs abutting against the link and bracket, and a sliding rod for connecting the springs, substantially as described.

4. In a vehicle, the combination of a wheel-axle, a body, a supporting link for the body carried upon the wheel-axle, the link being pivoted substantially vertically over the wheel-axle and permitting the wheel-axle to displace along a rearwardly and upwardly curving path when a wheel strikes an obstruction, a pair of springs disposed on opposite sides of the link for opposing the displacement of the link, a bracket suitably mounted for resisting the thrust of the springs, the adjacent ends of the springs abutting against the link and bracket, a sliding rod for connecting the springs, and a buffer for preventing corresponding forward displacement of the link, substantially as described.

Signed at Columbus, Ohio, this 15th day of September, 1909.

HUGH EWING.

Witnesses:
ALICE B. COOK,
W. H. ENGLISH.